United States Patent [19]
Oomura et al.

[11] Patent Number: 5,295,363
[45] Date of Patent: Mar. 22, 1994

[54] METHOD AND APPARATUS OF CONTROLLING A COMPRESSOR OF AN AIR CONDITIONER

[75] Inventors: Naoki Oomura, Fuji; Atsushi Nagasawa, Mishima, both of Japan

[73] Assignee: Kabushiki Kaisha Toshiba, Kawasaki, Japan

[21] Appl. No.: 959,097

[22] Filed: Oct. 9, 1992

[30] Foreign Application Priority Data

Oct. 11, 1991 [JP] Japan .................................. 3-263992

[51] Int. Cl.$^5$ ............................................ G05D 23/19
[52] U.S. Cl. ................................... 62/227; 62/228.3; 62/228.4
[58] Field of Search .................. 62/228.4, 228.1, 228.3, 62/227, 157, 231, 229, 208, 209, 158

[56] References Cited

U.S. PATENT DOCUMENTS

| | | | |
|---|---|---|---|
| 4,798,057 | 1/1989 | Okamoto et al. | 62/228.3 |
| 5,040,379 | 8/1991 | Fukunaga et al. | 62/228.4 |
| 5,054,294 | 10/1991 | Dudley | 62/228.4 |

FOREIGN PATENT DOCUMENTS

0434424 8/1935 European Pat. Off. .
2215494 9/1989 United Kingdom .
2231692 11/1990 United Kingdom .

Primary Examiner—Harry B. Tanner
Attorney, Agent, or Firm—Foley & Lardner

[57] ABSTRACT

A method and apparatus of controlling an air conditioner. The discharge temperature of a compressor and the indoor heat exchanger temperature are steadily controlled to set temperatures as close as possible, suppressing hunting of the frequency of an inverter. A temperature sensor is provided for detecting the temperature of the indoor heat exchanger or the discharge temperature of the compressor. A control unit is further provided, and judges as to in which temperature zone among at least preset four temperature zones the detected temperature is. Then, the control unit outputs frequency control signals to the inverter to perform the following operations: when the detected temperature is in the lowest temperature zone, the output frequency of the inverter is increased at a predetermined speed; in a lower intermediate temperature zone the frequency is slowly increased; in an upper intermediate temperature zone below a set temperature the current frequency is maintained; and in a temperature zone above the set temperature the frequency is decreased at a predetermined speed.

9 Claims, 9 Drawing Sheets

METHOD AND APPARATUS OF CONTROLLING A COMPRESSOR OF AN AIR CONDITIONER

BACKGROUND OF THE INVENTION

The present invention relates to a method and apparatus of controlling an air conditioner, and more particularly relates to a method and apparatus of controlling the temperature of the indoor heat exchanger and/or the discharge temperature of the compressor of an air conditioner.

Figure 9:
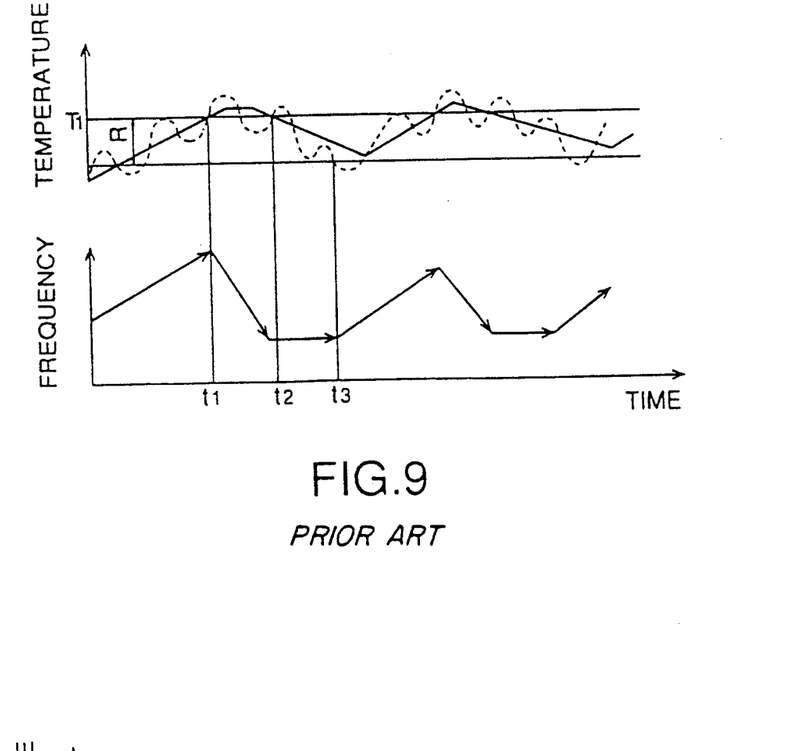
FIG. 9 is graph illustrating a typical conventional method of controlling indoor heat exchanger temperature or discharge temperature.
Figure 10:
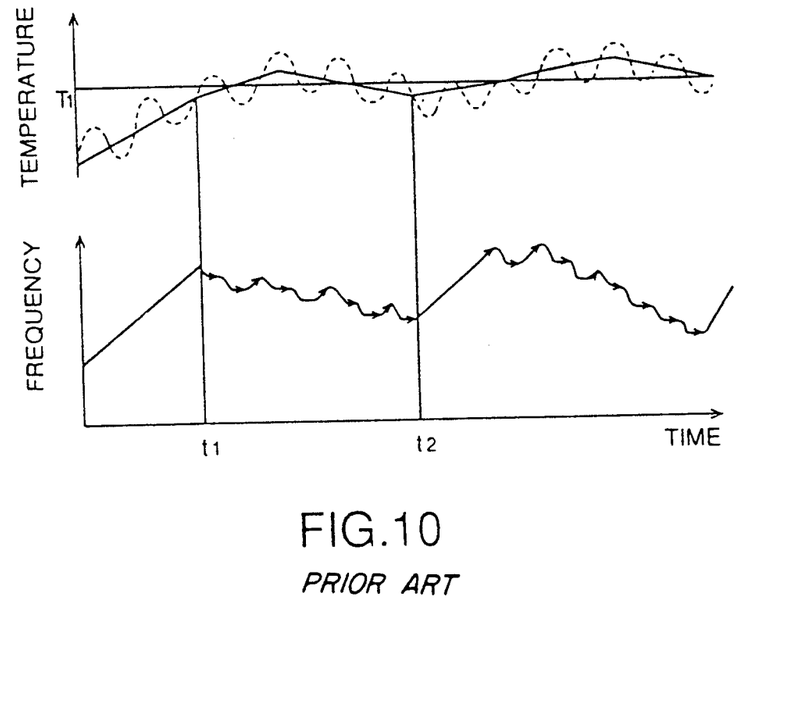
FIG. 10 is a graph illustrating another typical conventional method of controlling indoor heat exchanger temperature or discharge temperature.

Generally, the air conditioner has a capacity of controlling the temperature of indoor heat exchanger and the discharge temperature of the compressor to or below predetermined values. FIGS. 9 and 10 illustrate typical examples of controlling compressors according to conventional methods. In these methods, the output frequency of the inverter is controlled according to detected temperature of discharge gas (hereinafter referred to as discharge temperature Td) of the compressor and detected temperature of the indoor heat exchanger (hereinafter referred as indoor heat exchanger temperature Tc) so that these temperatures are maintained at or below preset values. In FIGS. 9 and 10, the broken lines indicate actual variations of temperature whereas the solid line mean temperature variations per unit time.

In FIG. 9, when it is detected that the discharge temperature Td exceeds the set temperature T1 (time t1), the output frequency of the inverter is continuously decreased, so that the discharge temperature Td is dropped so as to be maintained within a safe range of a set temperature width $a$ below the set temperature T1. When the discharge temperature Td drops below the safe range (time t3), the output frequency of the inverter is increased. After the output frequency turns to decrease, in this method of control the output frequency varies at a constant gradient even if the discharge temperature Td exceeds the set temperature T1 by a variation thereof (time t2).

The control method of FIG. 10 is the same as the control of FIG. 9 in that the output frequency of the inverter is decreased when the indoor heat exchanger temperature Tc exceeds the set temperature T1 in a heating operation, but in the method of FIG. 10, the output frequency of the inverter is dropped stepwisely for a predetermined time, 5 Hz for 20 seconds, for example. On the contrary, when the indoor heat exchanger temperature Tc drops below the set temperature T1, in this method the output frequency is continuously raised.

The control method of FIG. 9 is disadvantageous in that the frequency rather largely varies, and that hunting thereof frequently occurs. In hunting, the frequency becomes unstable. To draw the capacity of the air conditioner to the maximum it is preferable to maintain the discharge temperature Td and the indoor heat exchanger temperature Tc closely to respective set temperatures but in practice there is a tendency such that the discharge temperature Td and the indoor heat exchanger temperature Tc are controlled below set temperatures. The control of FIG. 10 is superior to that of FIG. 9 in that the variation of the output frequency of the inverter is fairly small but there still remains a disadvantage in that any hunting of the frequency and a tendency of controlling the discharge temperature Td and the indoor heat exchanger temperature Tc below set temperatures are not improved.

This is because the controlled variables, the discharge temperature Td and the indoor heat exchanger temperature Tc each vary repeating fine hunting. More specifically, the discharge temperature Td and indoor heat exchanger temperature Tc actually finely vary about mean values as shown by broken lines in FIGS. 9 and 10 although they vary smoothly as indicated by solid lines when plotted as mean variations per unit time. The temperature sensor directly detects these fine variations, and the output frequency is varied according to detected variations. There is therefore a problem in that hunting of the frequency is not sufficiently prevented.

SUMMARY OF THE INVENTION

Accordingly, it is an object of the present invention to provide a method of controlling of an air conditioner which method is capable of controlling the discharge temperature and the temperature of the indoor heat exchanger to set temperatures as close as possible while hunting of the output frequency is suppressed.

It is another object of the present invention to provide an apparatus for practicing the method.

In view of this and other objects, one aspect of the present invention is directed to a method of controlling an air conditioner, comprising the steps of: (a) detecting a temperature of an indoor heat exchanger and providing a temperature signal representing the detected temperature of the indoor heat exchanger; (b) on the basis of the temperature signal, judging as to in which temperature zone among at least four temperature zones the detected temperature of the indoor heat exchanger is; (c) when the detected temperature of the indoor heat exchanger is in the lowest temperature zone, providing an inverter with a first frequency control signal for increasing an output frequency of the inverter at a first predetermined speed; (d) when the detected temperature of the indoor heat exchanger is in a lower intermediate temperature zone, providing the inverter with a second frequency control signal for increasing an output frequency of the inverter at a speed slower than the first predetermined speed; (e) when the detected temperature of the indoor heat exchanger is in an upper intermediate temperature zone below a set temperature, providing the inverter with a third frequency control signal for maintaining a current output frequency of the inverter; and (f) when the detected temperature of the indoor heat exchanger is in the highest temperature zone above the set temperature, providing the inverter with a fourth frequency control signal for decreasing the output frequency of the inverter at a second predetermined speed, whereby hunting of the output frequency is suppressed and the temperature of the indoor heat exchanger is controlled to the set temperature as close as possible.

According to the first aspect of the present invention, the output frequency of the inverter is gradually increased and then maintained as it is, as the indoor heat exchanger temperature rises closely to the set temperature. Therefore, the output frequency is not excessively raised, and variations of the frequency and indoor heat exchanger temperature are suppressed.

A second aspect of the present invention is directed to a method of controlling an air conditioner, comprising the steps of: (a) detecting a discharge temperature of a compressor and providing a temperature signal representing the detected discharge temperature; (b) on the basis of the temperature signal, judging as to in which temperature zone among at least four temperature zones the detected discharge temperature is; (c) when the detected discharge temperature is in the lowest temperature zone, providing an inverter with a first frequency control signal for increasing an output frequency of the inverter at a first predetermined speed; (d) when the detected discharge temperature is in a lower intermediate temperature zone, providing the inverter with a second frequency control signal for increasing an output frequency of the inverter at a speed slower than the first predetermined speed; (e) when the detected discharge temperature is in an upper intermediate temperature zone below a set temperature, providing the inverter with a third frequency control signal for maintaining a current output frequency of the inverter; and (f) when the detected discharge temperature is in the highest temperature zone above the set temperature, providing the inverter with a fourth frequency control signal for decreasing the output frequency of the inverter at a second predetermined speed, whereby hunting of the output frequency is suppressed and the temperature of the discharge temperature of the compressor is controlled to the set temperature as close as possible.

According to the second aspect of the present invention, the output frequency of the inverter is gradually increased and then maintained as it is, as the discharge temperature rises closely to the set temperature. Therefore, the output frequency is not excessively raised, and variations of the frequency and discharge temperature are suppressed.

According to a third aspect of the present invention there is provided an apparatus of controlling an air conditioner of the type including an inverter for outputting an output frequency to control a rotational speed of a compressor, and an indoor heat exchanger, comprising a temperature sensor for detecting a temperature of the indoor heat exchanger and for outputting a detected temperature signal representing the detected temperature of the indoor heat exchanger, and control means for: judging on the basis of the temperature signal as to in which temperature zone among at least four temperature zones the detected temperature of the indoor heat exchanger is; providing the inverter with a first frequency control signal for increasing an output frequency of the inverter at a first predetermined speed when the detected temperature of the indoor heat exchanger is in the lowest temperature zone; providing the inverter with a second frequency control signal for increasing an output frequency of the inverter at a speed slower than the first predetermined speed when the detected temperature of the indoor heat exchanger is in a lower intermediate temperature zone; providing the inverter with a third frequency control signal for maintaining a current output frequency of the inverter when the detected temperature of the indoor heat exchanger is in an upper intermediate temperature zone below a set temperature; and providing the inverter with a fourth frequency control signal for decreasing the output frequency of the inverter at a second predetermined speed when the detected temperature of the indoor heat exchanger is in the highest temperature zone above the set temperature, whereby hunting of the output frequency is suppressed and the temperature of the indoor heat exchanger is controlled to the set temperature as close as possible.

A third aspect of the present invention is directed to an apparatus of controlling an air conditioner of the type including an inverter for outputting an output frequency to control a rotational speed of a compressor, and a compressor, comprising a temperature sensor for detecting a discharge temperature of the compressor and for outputting a detected temperature signal representing the detected discharge temperature, and control means for: judging on the basis of the temperature signal as to in which temperature zone among at least four temperature zones the detected discharge temperature is; providing the inverter with a first frequency control signal for increasing an output frequency of the inverter at a first predetermined speed when the detected discharge temperature is in the lowest temperature zone; providing the inverter with a second frequency control signal for increasing an output frequency of the inverter at a speed slower than the first predetermined speed when the detected discharge temperature is in a lower intermediate temperature zone; providing the inverter with a third frequency control signal for maintaining a current output frequency of the inverter when the detected discharge temperature is in an upper intermediate temperature zone below a set temperature; and providing the inverter with a fourth frequency control signal for decreasing the output frequency of the inverter at a second predetermined speed when the detected discharge temperature is in the highest temperature zone above the set temperature, whereby hunting of the output frequency is suppressed and the discharge temperature of the compressor is controlled to the set temperature as close as possible.

DETAILED DESCRIPTION OF THE PREFERRED EMBODIMENTS

Referring to the drawings an air conditioner according to the present invention will be described hereinafter.

Figure 1:
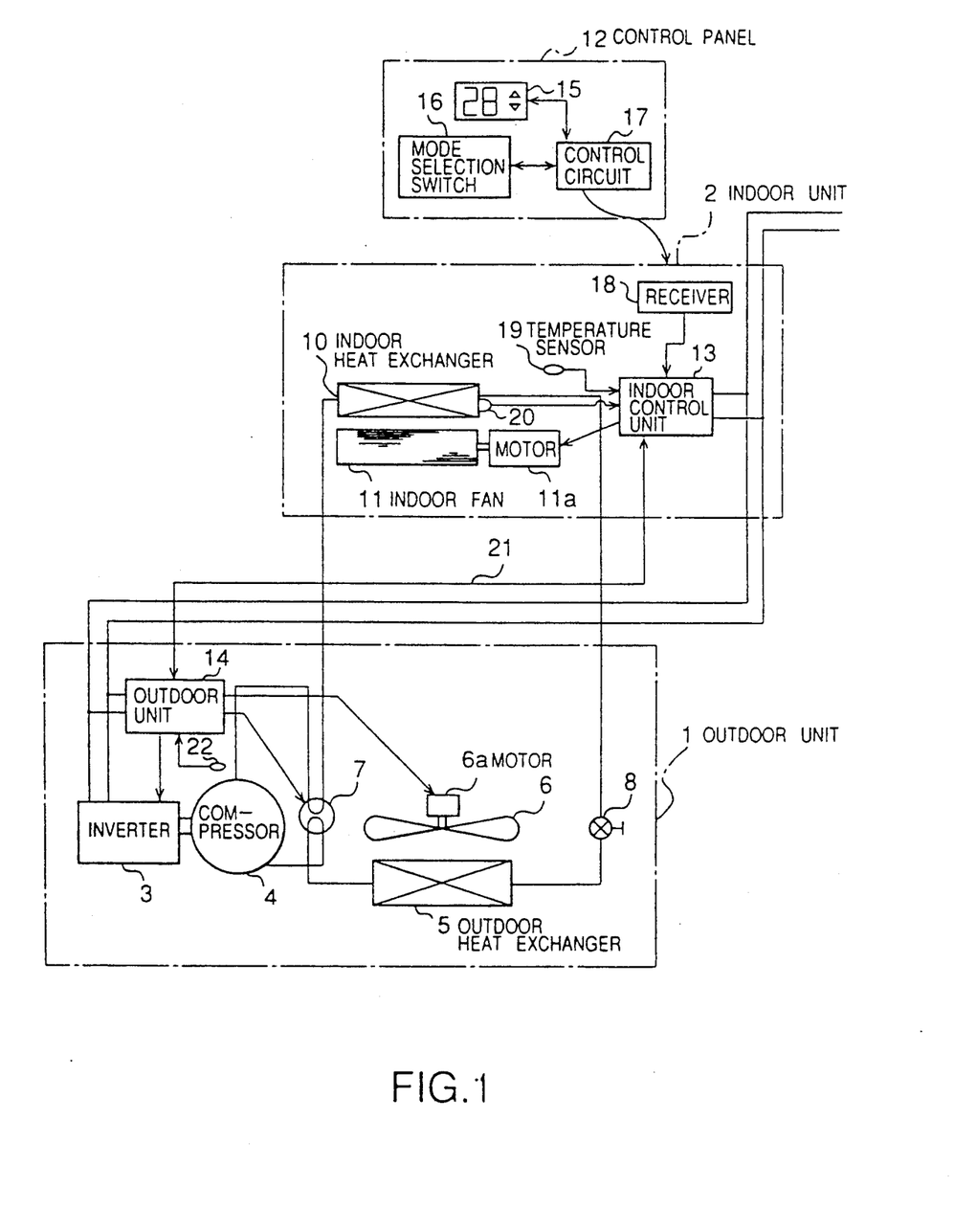
FIG. 1 is an illustration of an air conditioner according to the present invention.

FIG. 1 illustrates the air conditioner, and the reference numeral 1 designates a outdoor unit and indoor unit 2 an indoor unit. The outdoor unit 1 is provided with a compressor 4 of which revolution is controlled by varying the frequency by an inverter 3. A high temperature and high pressure coolant which is discharged from the compressor 4 is condensed or evaporated by a outdoor heat exchanger 5. The outdoor heat exchanger 5 is cooled by an outdoor fan 6. A duct which communicates between the compressor 4 and the outdoor heat exchanger 5 includes a four way valve 7, which switches cooling and heating modes. An expansion valve 8 is provided to a duct communicating the outdoor heat exchanger 5 to the indoor unit 2. The indoor unit 2 includes an indoor heat exchanger 10 and an indoor fan 11.

Now, the control system of the air conditioner will be described. In the air conditioner of this embodiment, temperature setting and switching of cooling and heating modes are conducted by a wireless remote control panel 12. The outdoor unit 1 and the indoor unit 2 include an indoor control unit 13 and an outdoor control unit 14, respectively. The indoor control unit 13 and the outdoor control unit 14 are each provided with a microcomputer, and receive operation signals as input signals from the control panel 12 for operating according to programs previously provided. The control panel 12 is provided with a temperature setter 15 and a mode selection switch 16 in addition to an operation switch (not shown). The temperature setter 15 sets reference temperatures of indoor heat exchanger temperature and the room temperature. The mode selection switch 16 selects a mode of heating or cooling. The temperature setting signals from the temperature setter 15 and mode selection signals from the mode selection switch 16 are provided to a receiving unit 18 of the indoor unit 2 through a control circuit 17, and are then sent to the indoor control unit 13 from the receiving unit 18. The temperature data of a room temperature sensor 19 and an indoor heat exchanger temperature sensor 20 is introduced to the indoor control unit 13, and the temperature data and the control signals are then transmitted to the outdoor control unit 14 through a signal line 21. A discharge temperature sensor 22 detects a discharge temperature Td of the compressor 4, and sends an output representing the discharge temperature Td to the outdoor control unit 14. On the basis of these inputs the outdoor control unit 14 outputs control signals to the compressor 4, the outdoor fan motor 6a and the four way valve 7 according to the procedure of a program shown in FIG. 3.

Figure 2:
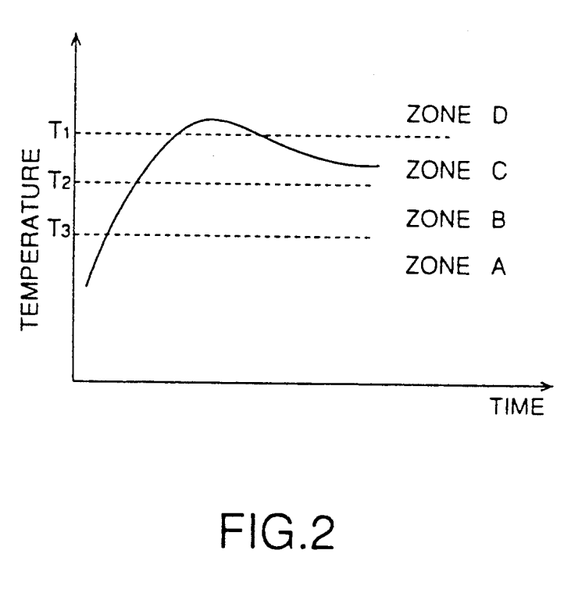
FIG. 2 is a graph showing variations of the indoor heat exchanger temperature or the discharge temperature of the compressor from the start of the air conditioner of FIG. 1.

FIG. 2 is a graph showing time variations of the discharge temperature Td of the compressor 4 or indoor heat exchanger temperature Tc while the air conditioner is performing heating operation at the maximum. In this embodiment, an indoor heat exchanger temperature Tc. is detected by the indoor heat exchanger temperature sensor 20. The outdoor control unit 14 judges which temperature zone of four temperature zones A to D the indoor heat exchanger temperature Tc belongs:

A zone: $Tc \leq T3$
B zone: $T3 \leq Tc \leq T2$
C zone: $T2 \leq Tc \leq T1$
D zone: $T1 \leq Tc$ According to the result of the judgment, the outdoor control unit 14 executes an operation to vary the output frequency of the inverter 3. In the lowest temperature zone A among the temperature zones A to D, the output frequency of the inverter 3 is continuously elevated at a normal ascending speed since the difference between the indoor heat exchanger temperature Tc and the previously set temperature T1 may be large. In the B zone which is a temperature zone higher than the A zone, the output frequency of the inverter 3 is raised at a speed slower than the frequency increasing speed of the temperature zone A. The temperature zones C and D are temperature zones separated at the set temperature T1. The temperature zone C is set so that the indoor heat exchanger temperature Tc may not be so excessively elevated to exceed the set temperature T1. In the temperature zone C any rise in the output frequency of the inverter 3 is prohibited, and the current output frequency is maintained. In spite of the temperature zone C, the indoor heat exchanger temperature Tc may exceed the set temperature T1. In such an event, the output frequency is dropped at a predetermined speed in the temperature zone D.

Figure 3:
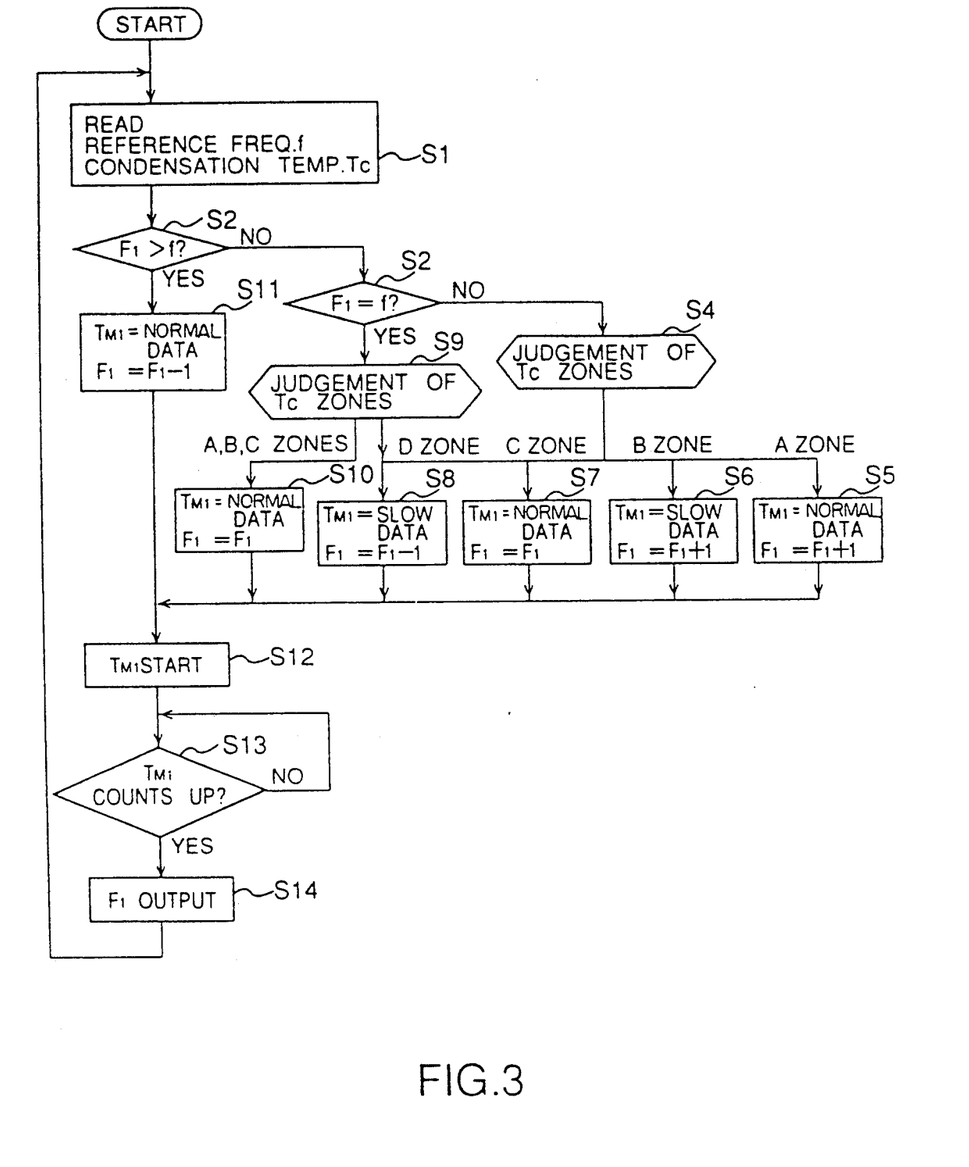
FIG. 3 is a flow chart describing the operation of the control unit of FIG. 1, according to one embodiment of the present invention.

Now, specific operation of the outdoor control unit 14 during such control modes will be illustrated along the flow chart of FIG. 3. First, in step S1, the outdoor control unit 14 reads in a reference frequency f and an indoor heat exchanger temperature Tc sent from the indoor control unit 13. The reference frequency f is data which is calculated from the indoor control unit 13 on the basis of the difference between the set room temperature and the current room temperature. In the following steps, operation for increasing and decreasing the output frequency of the inverter 3 is executed with the reference frequency f as an upper limit of the output frequency.

Subsequently in the step S2, the reference frequency f and the output frequency F1 of the inverter 3 are compared.

In a normal operation condition, the output frequency F1 is equal to or below the reference frequency f, and the central processing unit (CPU) proceeds to step S3, in which it is judged whether or not the output frequency F1 is equal to the reference frequency f. Then, in steps S4 and S9, it is judged to which temperature zone the indoor heat exchanger temperature Tc belongs. According to judged temperature zones, procedures to set varied speed data of an output frequency are executed. In the case where the indoor heat exchanger temperature Tc is in the lowest temperature zone A (step S5), to raise the output frequency of the inverter 3 at a normal time interval data for raising frequency is set to the frequency outputting timer TM1, and data of the output frequency F1 is incremented +1. At the normal ascending speed, the output frequency F1 is raised 1 Hz at a time interval of 0.5 sec, for example. When the indoor heat exchanger temperature Tc belongs to the temperature zone B (step S6), the output frequency of the inverter 3 is raised at a change speed slower than the normal speed, for example, 1 Hz per 2 sec. For this reason, slow data of time interval to raise the frequency is set to the frequency outputting timer TM1, and the data of the output frequency F1 is incremented +1. In the step S7 where the indoor heat exchanger temperature Tc is in the temperature zone C, data to keep the current output frequency F1 is set. In the step S8, in which the indoor heat exchanger temperature Tc is in the temperature zone D, the output frequency is dropped at a relatively slow varied speed data, 1 Hz per 2 sec. for example. A slow data of time interval to decrease frequency is set to the frequency outputting timer TM1 while the data of the output frequency F1 is decremented −1.

In the subsequent step S12, the frequency outputting timer TM1 is started. Then, in the step S13, judgment is made as to whether or not the set time sets in the previous steps expires. When the set time passes, in the step S14 a frequency control signal representing the set output frequency F1 is outputted to the inverter 3. Then, the CPU returns to step S1.

The step S9 corresponds to a case where the current output frequency F1 is equal to the reference frequency f. When the indoor heat exchanger temperature Tc falls in a still low level A to C zone, in the step S10, the current frequency is maintained. On the other hand, when the indoor heat exchanger temperature Tc is in the D zone, it is likely that the indoor heat exchanger temperature Tc excessively exceeds the set temperature T1 if the frequency is maintained. The CPU, therefore, proceeds to the step 8, where to slowly drop the output frequency F1, the frequency outputting timer TM1 is set to a slow data of time interval to decrease the frequency while the data of the output frequency F1 is decremented −1. In the case where the current output frequency F1 is above the reference frequency f due to a drop in the reference frequency f caused by a variation of the room temperature, the CPU goes to the step S11 from the step S2. In this case, the output frequency F1 must be decreased to the reference frequency f at the normal varied speed data. Therefore, in the step S11 the frequency outputting timer TM1 is set to the normal data of time interval to decrease the frequency while the data of the output frequency F1 is decremented −1.

Figure 4:
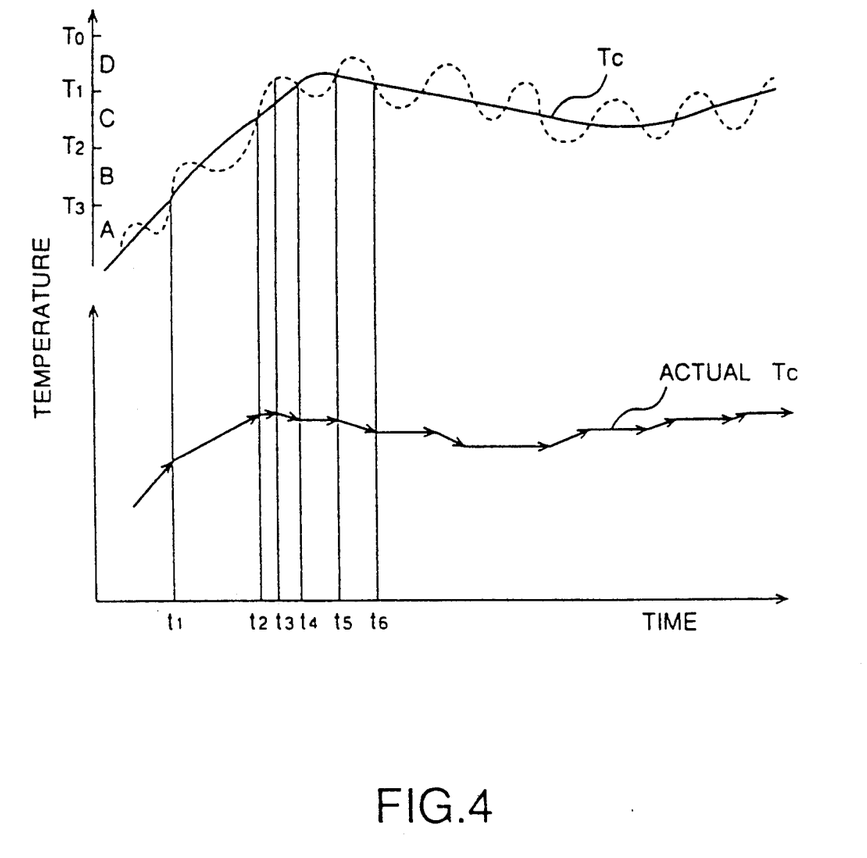
FIG. 4 is a time chart plotting variations of output frequency of the inverter against time and variations of indoor heat exchanger temperature Tc against time.

FIG. 4 is a graph illustrating variations of the indoor heat exchanger temperature Tc and the output frequency F1 when the foregoing controlling is conducted. In FIG. 4, the indoor heat exchanger temperature Tc is plotted by a smooth solid line which represents mean temperature variation per unit time whereas variation of actual indoor heat exchanger temperature Tc detected by the indoor heat exchanger temperature sensor 20 is indicated by the broken line. Accordingly, the output frequency of the inverter 3 increases or decreases according to a variation in the actual indoor heat exchanger temperature Tc. More specifically, during the time interval from the start of the operation to time t1, the output frequency rises at the normal speed since the indoor heat exchanger temperature Tc is in the temperature zone A. As a result, the revolution of the compressor 4 increases, so that the indoor heat exchanger temperature Tc continues to rise. When the indoor heat exchanger temperature Tc comes into the temperature zone B (time t1-t2), the output frequency goes up at a slower speed slower than the previous speed. Therefore, the indoor heat exchanger temperature Tc slowly ascends, and when the indoor heat exchanger temperature Tc reaches the temperature zone C, the output frequency is maintained as it is (time t2-t3). In the case where the indoor heat exchanger temperature Tc arrives at the temperature zone D in spite of keeping the output frequency (time t3-t4), the output frequency is gradually decreases, so that the indoor heat exchanger temperature Tc turns from ascending to descending. When the indoor heat exchanger temperature Tc descends to the temperature zone C (time t4-t5), the output frequency is maintained as it is. Then, the indoor heat exchanger temperature Tc is kept close to the set temperature T1 without any large variation repeating small variations in the vicinity of the set temperature T1 between the temperature zone D and the temperature zone C.

In the embodiment, the indoor heat exchanger temperature Tc is controlled by changing the output frequency of the inverter 3 depending upon which temperature zone among four A to D zones the indoor heat exchanger temperature Tc detected belongs to during heating.

In place of the indoor heat exchanger temperature Tc, the discharge temperature Td of the compressor 4 may be detected by the discharge temperature sensor 22, and according to a temperature zone to which the discharge temperature Td belongs the output frequency of the inverter 3 may be similarly changed. The indoor heat exchanger temperature Tc during heating and the discharge temperature Td vary to correspond to a variation in revolution of the compressor 4, and behave similarly as the output frequency of the inverter 3 varies. The two methods of controlling the frequency of the inverter 3 achieve the same advantageous effect from the point of suppressing variation of the output frequency to as small as possible.

Another embodiment will be described with reference to FIGS. 5a and 5b and 6 to 8. Also in the second embodiment as in the first embodiment, the output frequency of the inverter 3 is varied for each of four temperature zones A to D to keep the indoor heat exchanger temperature Tc or discharge temperature Td at a set temperature T1 (see FIG. 5a). When the indoor heat exchanger temperature Tc or discharge temperature Td returns from temperature zone D to the temperature zone C, the temperature zone C is expanded toward the high temperature side (see FIG. 5b). In the temperature zone D the output frequency F1 is gradually decreased while in the temperature zone C the output frequency F1 is maintained. Then, the output frequency of the inverter 3 is changed according to the temperature zones A' to D'.

Figure 6:
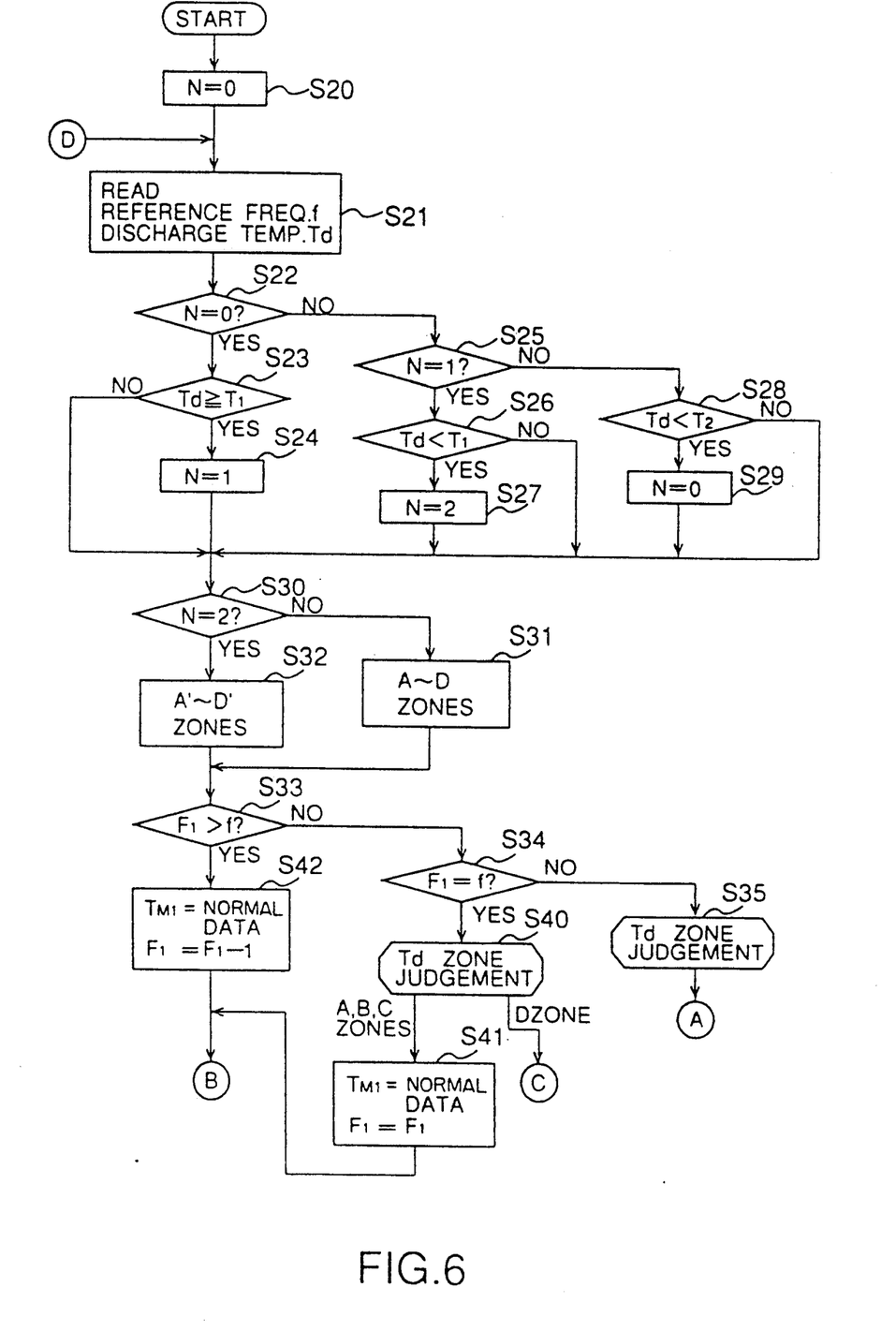
FIG. 6 is a flow chart describing the operation of the control unit of FIG. 1, according to one embodiment of the present invention.

As specific procedures of the outdoor control unit 14 to conduct controlling in the second embodiment, the control of the discharge temperature Td will be described with reference to the flow chart of FIG. 6. First, steps S20 to S32 are procedures to distinguish variations, caused by a drop of discharge temperature Td from the D zone to the C zone, from variations of the discharge temperature Td between the temperature zones A to D in the process of variations of the discharge temperature Td due to variations in the output frequency. In such a case, the variable N may be one of 0, 1, and 2. When the discharge temperature Td is included in the temperature zone B, the variable N is set to 0. When the discharge temperature Td is in the temperature zone C, the variable N is set to 2. When the discharge temperature Td is included in the temperature zone D, 1 is assigned to the variable N. From the value of the variable N, it is judged that the discharge temperature Td has changed from the D zone to the C zone.

First, in the step S20, variable N is initialized to 0, and then in the step S21 reference frequency f and the discharge temperature Td are read in. Then, the CPU goes to the step S22, and judges whether or not the variable N is 0. When the variable N is 0, the CPU proceeds to the step S23, in which the discharge temperature Td and the set temperature T1 which divides C and D zones are compared. In the case where the discharge temperature Td is not lower than the set temperature T1, in the step S24 the variable N is set to 1. On the contrary, when in the step S22 the variable N is not 0, the CPU goes to step S25, in which judgement is made as to whether or not the variable N is 1. When the answer is affirmative, that is, the discharge temperature Td was in the temperature zone D, the CPU goes to step S26. In the step S26, comparison is made between the current discharge temperature Td and the set temperature T1. When the discharge temperature Td is below the set temperature T1, the CPU goes to step S27, where the variable N is set to 2. Only when the variable N is 2 at this stage, it means that the discharge temperature Td has descended from the temperature zone D to the temperature zone C. Accordingly, it is possible to distinguish this temperature variation from the other temperature variations by judging in step S30 whether or not the variable N is 2.

Figure 5:
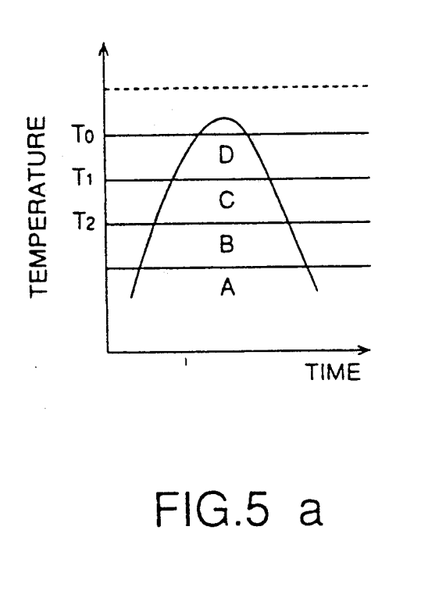
FIGS. 5a and 5b illustrate how to upwardly expand the upper limit of the upper intermediate temperature zone after the temperature of the indoor heat exchanger or the discharge temperature of the compressor drops from the highest temperature zone to the upper intermediate temperature zone.
Figure 7:
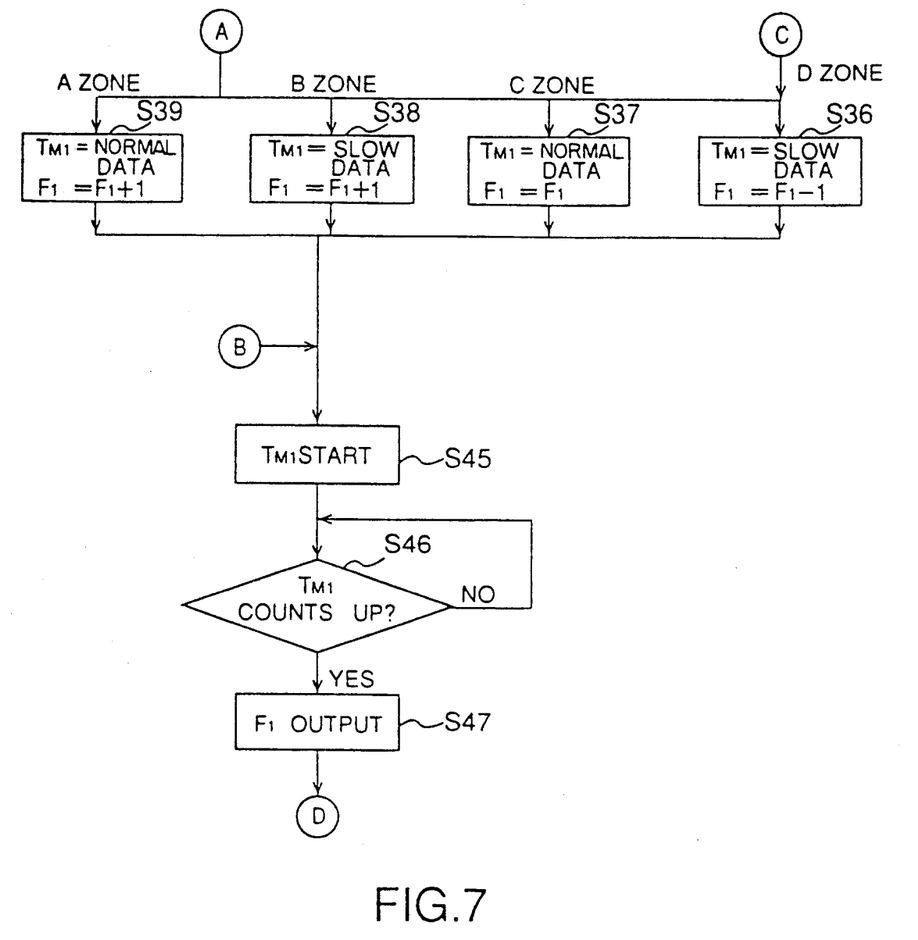
FIG. 7 is a flow chart continued form the flow chart of FIG. 6.

According to the result of the judgement in step S30, the CPU proceeds to step S31 when the variable N is not equal to 2. In the step S31, the pattern of temperature zones A to D of FIG. 5a is selected. When the variable N is equal to 2, the CPU goes to step S32, in which the pattern of temperature zones A' to D' of FIG. 5b is selected. The operations of steps S33 to S47, shown in FIGS. 6 and 7, are the same as the operations of the flow chart of FIG. 3. Although detailed description thereof is omitted, in short in steps S33 to S34 it is judged which zone among temperature zones A to D and temperature zones A' to D', the discharge temperature Td is, and the output frequency of the inverter 3 is changed according to the judged temperature zone: in A and A' zones the output frequency is increased at a normal variation speed; also in this embodiment in B and B' zones the output frequency is increased more slowly than normal; in C and C' zones the current output frequency is maintained; and in D and D' zones the frequency is decreased more slowly than normal.

Figure 8:
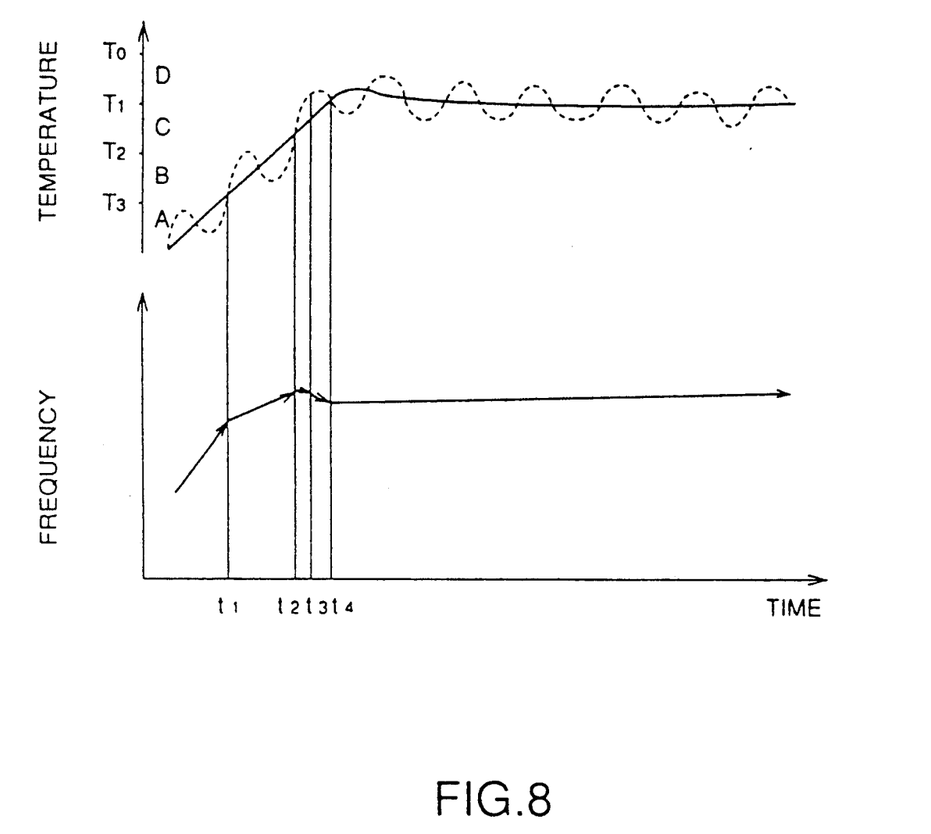
FIG. 8 is graph showing variations of output frequency of the inverter against time and variations of indoor heat exchanger temperature Tc against time.

FIG. 8 is a graph showing variations of the discharge temperature Td and the output frequency against time when the foregoing controlling is carried out. The discharge temperature Td is plotted by a solid line which represents mean temperature variations per unit time whereas variation of actual discharge temperature Td is indicated by the broken line.

The discharge temperature Td of the compressor 4 is low until time t1 just after the start of the air conditioner, and in this stage of temperature zone A the output frequency of the inverter 3 rises at a normal speed. The discharge temperature Td follows this rise of the output frequency, and ascends with variations due to response delays. During the time interval from time T1 to T2, the output frequency rises at a speed more slowly than before so that the discharge temperature Td does not ascend too high. The discharge temperature Td enters the temperature zone B at the time t1. The discharge temperature Td generally continues to rise, and reaches to the temperature zone C, where the output frequency is maintained as it is (time t2-t3). When the discharge temperature Td continues to rise and arrives at the temperature zone D, the output frequency is dropped, so that the discharge temperature Td turns form ascending to descending. The drop of the output frequency causes the discharge temperature Td to goes down from the temperature zone D to the temperature zone C. This temperature variation is judged from the procedures of the steps S22, S25, S26, S27, S30 and S32 of the flow chart of FIG. 6, and in the step S32 the temperature zone C is expanded to a C' zone having a higher upper limit. After this time t4, the discharge temperature Td is steadily kept repeating small variations within the temperature zone of the C' zone, and the output frequency is therefore maintained at a predetermined value.

In the second embodiment, the discharge temperature Td is controlled by varying the output frequency of the inverter 3 depending on to which temperature zone among four temperature zones A to D a detected discharge temperature Td belongs. Instead of the discharge temperature Td, the indoor heat exchanger temperature Tc may be detected by the indoor heat exchanger temperature sensor 20, and the output frequency of the inverter 3 may be increased or decreased according to temperature zones within which the indoor heat exchanger temperature Tc is.

What is claimed is:

1. A method of controlling an air conditioner, comprising the steps of:
(a) detecting a temperature of an indoor heat exchanger and providing a temperature signal representing the detected temperature of the indoor heat exchanger;
(b) on the basis of the temperature signal, judging as to in which temperature zone among at least four temperature zones the detected temperature of the indoor heat exchanger is;
(c) when the detected temperature of the indoor heat exchanger is in the lowest temperature zone, providing an inverter with a first frequency control signal for increasing an output frequency of the inverter at a first predetermined speed;
(d) when the detected temperature of the indoor heat exchanger is in a lower intermediate temperature zone, providing the inverter with a second frequency control signal for increasing an output frequency of the inverter at a speed slower than the first predetermined speed;
(e) when the detected temperature of the indoor heat exchanger is in an upper intermediate temperature zone below a set temperature, providing the inverter with a third frequency control signal for maintaining a current output frequency of the inverter; and
(f) when the detected temperature of the indoor heat exchanger is in the highest temperature zone above the set temperature, providing the inverter with a fourth frequency control signal for decreasing the output frequency of the inverter at a second predetermined speed, whereby hunting of the output frequency is suppressed and the temperature of the indoor heat exchanger is controlled to the set temperature as close as possible.

2. A method of controlling an air conditioner, as recited in claim 1, wherein:
(g) judging whether or not the temperature of the indoor heat exchanger drops from the highest temperature zone to the upper intermediate temperature zone;
(h) when the answer of the judging step (g) is affirmative, resetting an upper limit of the upper intermediate temperature zone at a level higher than the upper limit of the upper intermediate temperature zone of the step (e), whereby hunting of the output frequency is suppressed and the temperature of the indoor heat exchanger is controlled to the set temperature as close as possible.

3. A method of controlling an air conditioner, comprising the steps of:
(a) detecting a discharge temperature of a compressor and providing a temperature signal representing the detected discharge temperature;
(b) on the basis of the temperature signal, judging as to in which temperature zone among at least four temperature zones the detected discharge temperature is;
(c) when the detected discharge temperature is in the lowest temperature zone, providing an inverter with a first frequency control signal for increasing an output frequency of the inverter at a first predetermined speed;
(d) when the detected discharge temperature is in a lower intermediate temperature zone, providing the inverter with a second frequency control signal for increasing an output frequency of the inverter at a speed slower than the first predetermined speed;
(e) when the detected discharge temperature is in an upper intermediate temperature zone below a set temperature, providing the inverter with a third frequency control signal for maintaining a current output frequency of the inverter; and
(f) when the detected discharge temperature is in the highest temperature zone above the set temperature, providing the inverter with a fourth frequency control signal for decreasing the output frequency of the inverter at a second predetermined speed, whereby hunting of the output frequency is suppressed and the temperature of the discharge temperature of the compressor is controlled to the set temperature as close as possible.

4. A method of controlling an air conditioner, as recited in claim 3, wherein:
(g) judging whether or not the discharge temperature drops from the highest temperature zone to the upper intermediate temperature zone;
(h) when the answer of the judging step (g) is affirmative, resetting an upper limit of the upper intermediate temperature zone at a level higher than the upper limit of the upper intermediate temperature zone of the step (e), whereby hunting of the output frequency is suppressed and the discharge temperature of the compressor is controlled to the set temperature as close as possible.

5. An apparatus of controlling an air conditioner of the type including an inverter for outputting an output frequency to control a rotational speed of a compressor, and an indoor heat exchanger, comprising:
a temperature sensor for detecting a temperature of the indoor heat exchanger and for outputting a detected temperature signal representing the detected temperature of the indoor heat exchanger;
control means for:
judging on the basis of the temperature signal as to in which temperature zone among at least four temperature zones the detected temperature of the indoor heat exchanger is;
providing the inverter with a first frequency control signal for increasing an output frequency of the inverter at a first predetermined speed when the detected temperature of the indoor heat exchanger is in the lowest temperature zone;
providing the inverter with a second frequency control signal for increasing an output frequency of the inverter at a speed slower than the first predetermined speed when the detected temperature of the indoor heat exchanger is in a lower intermediate temperature zone;
providing the inverter with a third frequency control signal for maintaining a current output frequency of the inverter when the detected temperature of the indoor heat exchanger is in an upper intermediate temperature zone below a set temperature; and
providing the inverter with a fourth frequency control signal for decreasing the output frequency of the inverter at a second predetermined speed when the detected temperature of the indoor heat exchanger is in the highest temperature zone above the set temperature, whereby hunting of the output frequency is suppressed and the temperature of the indoor heat exchanger is controlled to the set temperature as close as possible.

6. An apparatus of controlling an air conditioner as recited in claim 5, wherein in the control means: it is judged whether or not the temperature of the indoor heat exchanger drops from the highest temperature zone to the upper intermediate temperature zone; and when the answer of the judgement is affirmative, an upper limit of the upper intermediate temperature zone is reset at a level higher than the upper limit of the previous upper intermediate temperature zone, whereby hunting of the output frequency is suppressed and the temperature of the indoor heat exchanger is controlled to the set temperature as close as possible.

7. An apparatus of controlling an air conditioner of the type including an inverter for outputting an output frequency to control a rotational speed of a compressor, and a compressor, comprising:
a temperature sensor for detecting a discharge temperature of the compressor and for outputting a detected temperature signal representing the detected discharge temperature;
control means for:
judging on the basis of the temperature signal as to in which temperature zone among at least four temperature zones the detected discharge temperature is;
providing the inverter with a first frequency control signal for increasing an output frequency of the inverter at a first predetermined speed when the detected discharge temperature is in the lowest temperature zone;
providing the inverter with a second frequency control signal for increasing an output frequency of the inverter at a speed slower than the first predetermined speed when the detected discharge temperature is in a lower intermediate temperature zone;
providing the inverter with a third frequency control signal for maintaining a current output frequency of the inverter when the detected discharge temperature is in an upper intermediate temperature zone below a set temperature; and
providing the inverter with a fourth frequency control signal for decreasing the output frequency of the inverter at a second predetermined speed when the detected discharge temperature is in the highest temperature zone above the set temperature, whereby hunting of the output frequency is suppressed and the discharge temperature of the compressor is controlled to the set temperature as close as possible.

8. An apparatus of controlling an air conditioner as recited in claim 7, wherein in the control means:

it is judged whether or not the discharge temperature drops from the highest temperature zone to the upper intermediate temperature zone; and when the answer of the judgement is affirmative, an upper limit of the upper intermediate temperature zone is reset at a level higher than the upper limit of the previous upper intermediate temperature zone, whereby hunting of the output frequency is suppressed and the discharge temperature of the compressor is controlled to the set temperature as close as possible.

9. A method of controlling an air conditioner, comprising the steps of:
 (a) detecting a temperature of an indoor heat exchanger and providing a temperature signal representing the detected temperature of the indoor heat exchanger;
 (b) on the basis of the temperature signal, judging a temperature zone among at least three temperature zones in which the detected temperature of the indoor heat exchanger lies;
 (c) when the detected temperature of the indoor heat exchanger is in a low temperature zone, providing an inverter with a first frequency control signal for increasing an output frequency of the inverter;
 (d) when the detected temperature of the indoor heat exchanger is in an intermediate temperature zone below a set temperature, providing the inverter with a second frequency control signal for maintaining a current output frequency of the inverter;
 (e) when the detected temperature of the indoor heat exchanger is in a high temperature zone above the set temperature, providing the inverter with a third frequency control signal for decreasing the output frequency of the inverter;
 (f) judging whether or not the temperature of the indoor heat exchanger drops from a high temperature zone to the intermediate temperature zone; and
 (g) when the answer of the judging step (f) is affirmative, resetting an upper limit of the intermediate temperature zone at a level higher than the upper limit of the intermediate temperature zone of the step (d), whereby hunting of the output frequency is suppressed and the temperature of the indoor heat exchanger is controlled to the set temperature as close as possible.

* * * * *